Dec. 5, 1950     L. F. HICKMAN ET AL     2,532,912
CRANKSHAFT SLEEVE
Filed July 15, 1949
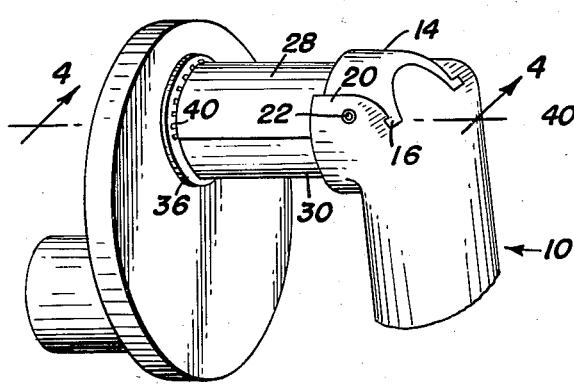
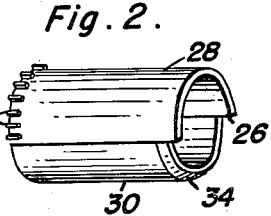
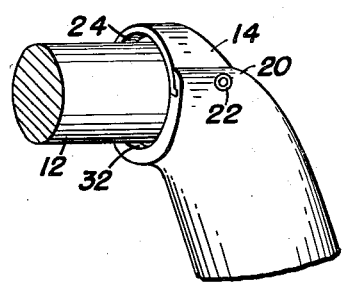
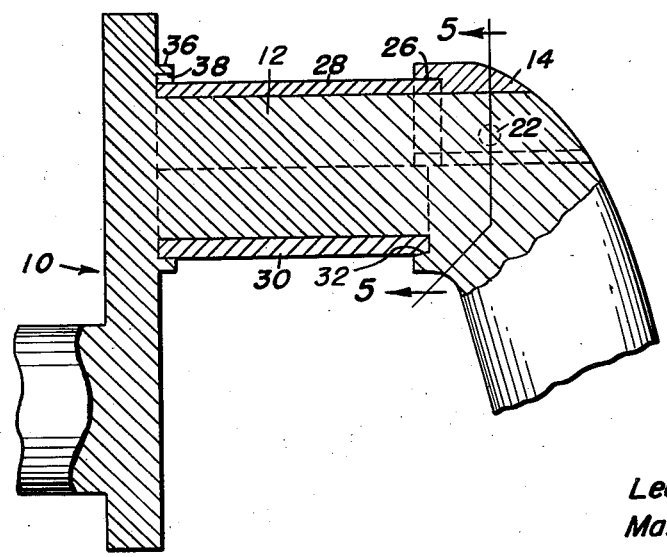
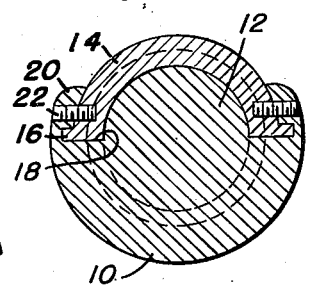
Inventors
Leo F. Hickman
Manuel Hickman
By *Clarence A. O'Brien and Harvey B. Jacobson*
Attorneys Patented Dec. 5, 1950

2,532,912

UNITED STATES PATENT OFFICE 2,532,912

CRANKSHAFT SLEEVE

Leo F. Hickman and Manuel Hickman,
Corpus Christi, Tex.

Application July 15, 1949, Serial No. 104,878

7 Claims. (Cl. 74—595)

This invention relates generally to engines and more particularly to a replaceable crankshaft sleeve, the crankshafts being originally constructed with such a sleeve in place, and the crankshaft itself is modified from the conventional form thereof to receive the sleeve and retaining means therefor.

A primary object of this invention is to facilitate the reconditioning of a crankshaft after a certain amount of wear has taken place, the invention being illustrated as applied to a journal of the crankshaft upon which a piston rod is connected, and the underlying purpose of the invention is, of course, to provide for the maintenance of proper connection of the piston rod on the crankshaft journal.

A more specific object is to provide a crankshaft sleeve in longitudinally divided form so that an upper section of the sleeve will be placed into position subsequently to the placing of a lower section on the crankshaft journal, the upper section aiding materially in holding the lower section in place and in preventing the rotation of the sleeve during the use of an engine with this invention applied thereto, and an allied object is the provision of a divided sleeve assembly permitting the easy removal and replacement of the sleeve.

Yet another object of this invention is to provide a crankshaft replaceable sleeve assembly, in which the crankshaft itself is not unduly weakened, the cross-sectional size of the crankshaft being at no place reduced so as to cause any danger of breaking.

Another object of this invention is to provide a specific sleeve structure and cooperating crankshaft structure, easily achieved by standard machining operations.

And a last object to be mentioned specifically is to provide a removable crankshaft sleeve assembly which is inexpensive to manufacture in original form, which greatly reduces the cost of maintenance of an engine wherein the device is used, and which is safe and convenient to use and will give durable and efficient service.

With these objects definitely in view, this invention resides in certain novel features of construction, combination and arrangement of elements and portions as will be hereinafter described in detail in the specification, particularly pointed out in the appended claims and illustrated in the accompanying drawings, which form a material part of this application, and in which:

Figure 1 is a three-dimensional view of a portion of a crankshaft with this invention operatively applied thereon;

Figure 2 is a three-dimensional view of the divided sleeve, removed from the crankshaft;

Figure 3 is a fragmentary view of a crankshaft adapted to receive the replaceable sleeve;

Figure 4 is a vertical sectional view of the structure shown in section 1, the figure including portions of the crankshaft in elevation and the section being taken on the line 4—4 in Figure 1; and Figure 5 is a vertical cross-sectional view taken on the line 5—5 in Figure 4.

Similar characters of reference designate similar or identical elements and portions throughout the specification and throughout the different views in the drawing.

Referring now to the drawing in detail, this invention is designed for use with a crankshaft which is exemplified by a crankshaft fragmentarily shown at 10, it being understood that the specific configuration of the crankshaft is immaterial in this application. The crankshaft 10 will include a journal 12, such as the journal used for connection to the piston rod of an engine, and the crankshaft at one end of the journal 12 will be recessed to accommodate a cap 14 which is concavo-convex transversely and which is provided with laterally extending tongues 16, the crankshaft being provided with suitably configurated slots 18 to receive the lateral portions, including the tongues 16, so that the cap can be slid into position, as from the right-hand side in Figure 1, into the position indicated in the figures.

The provision of the slots 18 is coincident with the provision of ears 20 which are elongated in the direction of the journal 12 and which are, of course, integral with the crankshaft 10, and these ears are apertured to receive flush set screws 22 which are threaded through the ears 20 and into threaded bores in the adjacent portions of the cap 14, it being preferred that a set screw 22 be provided on each side of each cap 14.

The cap 14 is provided with a semi-circular slot 24 to receive the end 26 of the upper section 28 of the longitudinally divided sleeve, the lower section thereof being indicated at 30. It should be carefully noted that the crankshaft is also provided with a tapered semi-circular slot 32 to receive the corresponding end of the lower section 30. In this connection, it will also be noted that the end 26 of the section 28 extends beyond the corresponding end of the section 30 and that the semi-circular slot in the cap 14 is deeper than the tapered semi-circular slot 32 in the crankshaft. The lower section 30 will have a tapered end 34 to fit within the tapered semi-circular slot 32.

The crankshaft, at the opposite end of the journal 12, is provided with a fixed integral collar 36 and this collar has radially extending, circumferentially spaced slots 38 on its inner periphery and throughout the one-half of the collar adjacent to the section 28, and this section 28 is provided with correspondingly spaced and dimensioned, radially extending, integral keys 40 to fit within the slots 38.

The operation of this invention will be clearly understood from a consideration of the mechanical details thereof, taken in connection with the drawing and the above recited objects. In recapitulation, it may be added that in removing the sleeve, the cap 14 is first removed, whereafter the section 18 is slid longitudinally of the journal 12 until the keys 40 are disengaged from the radially extending slots 38, whereafter the section 28 can be lifted from the crankshaft. The section 30 can be rotated into the position originally occupied by the section 28 and then removed. A new sleeve can then be installed, the steps being reversed from the steps described immediately above in connection with the removal of the worn sleeve.

It will be obvious that all of the objects recited above are amply achieved by this invention, and it should be understood that minor variation from the embodiment disclosed may be resorted to within the spirit of this invention and within the scope of the appended claims.

Having described the invention, what is claimed as new is:

1. A crankshaft having an annular slot at an end of a journal of the crankshaft, and a longitudinally divided sleeve fitting closely on said journal and terminally engaged in said slot, said crankshaft having a plurality of slots extending radially from said annular slot and said sleeve having radially extending integral keys to fit into said radially extending slots.

2. A crankshaft having an annular slot at an end of a journal of the crankshaft, and a longitudinally divided sleeve fitting closely on said journal and terminally engaged in said slot, the crankshaft having a removable cap at the opposite end of said journal, said cap and the adjacent portion of the crankshaft having complementary semi-circular slots receiving the other end of the sleeve.

3. A crankshaft having a removable cap at one end of a journal of the crankshaft, a sleeve for said journal divided into sections of different lengths, said cap and the adjacent portion of the crankshaft having registering semi-circular slots of different depths to receive the ends of said sections, a portion of said crankshaft having the deeper of said slots therein being removable to permit insertion of both said sections.

4. A crankshaft having a removable cap at one end of a journal of the crankshaft, a sleeve for said journal divided into sections of different lengths, said cap and the adjacent portion of the crankshaft having registering semi-circular slots of different depths to receive the ends of said sections, a portion of said crankshaft having the deeper of said slots therein being removable to permit insertion of both said sections, a fixed collar on said crankshaft at the other end of said sleeve, said collar having radial slots and one of said sections having radially disposed keys engaged in said radial slots to further insure against rotation of the sleeve relative to the journal.

5. A crankshaft sleeve assembly comprising a journal of the crankshaft, a removable cap at one end of said journal, said cap and an adjacent portion of the crankshaft having complementary semi-circular slots, a fixed collar coaxial with said journal and at the other end thereof, an annular slot in said collar, a longitudinally divided sleeve fitting closely on said journal and having its ends in said annular and semi-circular slots.

6. A crankshaft sleeve assembly comprising a journal of the crankshaft, a removable cap at one end of said journal, said cap and an adjacent portion of the crankshaft having complementary semi-circular slots, a fixed collar coaxial with said journal and at the other end thereof, an annular slot in said collar, a longitudinally divided sleeve fitting closely on said journal and having its ends in said annular and semi-circular slots, said sleeve having upper and lower complementary sections, the upper section being longer than the lower section and said semi-circular slot in the cap being deeper than the semi-circular slot in the crankshaft, whereby insertion of the lower section is facilitated and the sections are prevented from rotating on the journal.

7. A crankshaft sleeve assembly comprising a journal of the crankshaft, a removable cap at one end of said journal, said cap and an adjacent portion of the crankshaft having complementary semi-circular slots, a fixed collar coaxial with said journal and at the other end thereof, an annular slot in said collar, a longitudinally divided sleeve fitting closely on said journal and having its ends in said annular and semi-circular slots, said sleeve having upper and lower complementary sections, the upper section being longer than the lower section and said semi-circular slot in the cap being deeper than the semi-circular slot in the crankshaft, whereby insertion of the lower section is facilitated and the sections are prevented from rotating on the journal, said collar having radial slots extending from said annular slot, and said upper section having radially disposed integral keys on the corresponding end thereof to engage in said radial slots.

LEO F. HICKMAN.
MANUEL HICKMAN.

REFERENCES CITED

The following references are of record in the file of this patent:

UNITED STATES PATENTS

| Number | Name | Date |
|---|---|---|
| 1,731,758 | Viden | Oct. 15, 1929 |
| 1,759,233 | Kindervater | May 20, 1930 |

FOREIGN PATENTS

| Number | Country | Date |
|---|---|---|
| 78,312 | Switzerland | July 16, 1918 |